United States Patent [19]

Amano

[11] Patent Number: 4,807,052
[45] Date of Patent: Feb. 21, 1989

[54] REMOTELY CONTROLLABLE ELECTRONIC APPARATUS

[75] Inventor: Toshio Amano, Kanagawa, Japan

[73] Assignee: Sony Corporation, Tokyo, Japan

[21] Appl. No.: 104,100

[22] Filed: Oct. 5, 1987

[30] Foreign Application Priority Data

Oct. 24, 1986 [JP] Japan .............................. 61-253135

[51] Int. Cl.$^4$ .......................... H04N 5/44; H04B 1/16
[52] U.S. Cl. ........................... 358/194.1; 340/825.22; 340/825.72; 455/352; 455/355; 455/603
[58] Field of Search .................... 358/194.1; 455/352, 455/353, 355, 603; 340/825.22, 825.23, 825.24, 825.25, 825.56, 825.72

[56] References Cited

U.S. PATENT DOCUMENTS

| | | | |
|---|---|---|---|
| 4,539,711 | 9/1985 | Harger | 358/194.1 |
| 4,623,887 | 11/1986 | Welles | 340/825.57 |
| 4,626,847 | 12/1986 | Zato | 358/194.1 |
| 4,626,848 | 12/1986 | Ehlers | 358/194.1 |

Primary Examiner—Tommy P. Chin
Attorney, Agent, or Firm—Alvin Sinderbrand

[57] ABSTRACT

In an audio and/or video electronic apparatus, such as, a television receiver or a video tape recorder, which, in a remote control mode, is capable of having operations thereof controllable by respective first remote control codes in response to the reception of corresponding signals from a first remote or separate control transmitter intended for use with such apparatus; there is provided, as an integral component of the electronic apparatus, a nonvolatile memory in which, in a programming or learning mode, the first remote control codes are written in association with respective second remote control codes for controlling the same operations and which are generated in response to the reception of corresponding signals from a second remote control transmitter intended for use with a different electronic apparatus. After such programming, in the remote control mode of the apparatus, the reception of a control signal from the second remote control transmitter causes read-out from the nonvolatile memory of the first remote control code which is associated with the second remote control code corresponding to the received control signal for controlling the operation of the electronic apparatus in accordance with the read-out first remote control code.

12 Claims, 2 Drawing Sheets

REMOTELY CONTROLLABLE ELECTRONIC APPARATUS

BACKGROUND ON THE INVENTION

1. Field of the Invention

This invention relates generally to an audio and/or video electronic apparatus, such as, a television receiver, a cable converter, video tape recorder, or video or audio disc player and more particularly is directed to improvements in such audio and/or video electronic apparatus which may be controlled remotely, as by a separate remote control transmitter or commander.

2. Description of the Prior Art

It is well known to provide audio and/or video electronic apparatus, such as, television receivers and video tape recorders, with respective remote control transmitters or commanders which are separate or apart from the actual apparatus and can be manipulated by the user for emitting infrared or other signals by which the respective television receiver or video tape recorder may have its operations remotely controlled. In general, the various manufacturers of the mentioned electronic apparatus employ different remote control codes for remotely controlling the operations thereof. Thus, although some remotely controlled television receivers have been recently provided with a remote control transmitter or commander capable of also functioning to remotely control an associated video tape recorder, the desired use of a single remote control transmitter for remotely controlling a television receiver and a video tape recorder is possible only if both the television receiver and the video tape recorder have been produced by the same manufacturer or are otherwise adopted to be controlled by the remote control codes adopted by the manufacturer of the remote control transmitter or commander. It will be appreciated that, if a television receiver and a video tape recorder intended to be remotely controlled are either produced by different manufacturers or are not adopted to be controlled by a common set of remote control codes, then the user is confronted with the troublesome prospect of remotely controlling the television receiver and the video tape recorder by means of respective different remote control transmitters or commanders.

Even in those cases where a television receiver and a video tape recorder are produced by the same manufacturer and provided with a single remote control transmitter for remotely controlling the operations of both the television receiver and the video tape recorder, multiple controlling operations are required in some instances. For example, if the television receiver is initially conditioned for displaying a broadcast television picture while the video tape recorder is initially conditioned for recording the broadcast signal, the user has to effect remote control of the television receiver for change-over of the input thereto from the antenna terminal to the terminal connected to the output of the video tape recorder, and remote control of the user further has to separately effect the video tape recorder for change-over from its recording mode to its playback or reproducing mode.

It has further been proposed, for example, as disclosed in detail in U.S. Pat. No. 4,623,887, and in U.S. Pat. No. 4,626,848, to provide a reconfigurable remote control transmitter having the ability to learn, store and repeat the remote control codes from other remote control transmitters. Thus, in the case where a television receiver and a video tape recorder are produced by different manufacturers and provided with respective or separate remote control transmitters which do not employ a common set of remote control codes, the reconfigurable remote control transmitter is adapted, in its learning or programming mode, to receive control signals from the remote control transmitter for the television receiver, and to store the corresponding remote control codes, and then to receive control signals from the remote control transmitter for the video tape recorder and to store the corresponding remote control codes. After the learning and storing operations have been completed, the reconfigurable remote control transmitter is ready for use in effecting remote control of the operations of television receiver and/or video tape recorder. It will be appreciated that, in order to function in the above indicated manner, the reconfigurable remote control transmitter according to the prior art has to include an infrared or other light receiver for receiving the control signals from the remote control transmitters or commanders intended for use with the television receiver and the video tape recorder, respectively. Such infrared or other light receiver included in the reconfigurable remote control transmitter undesirably increases the size and the power consumption thereof which is clearly undesirable in a remote control transmitter intended to be hand-held. Moreover, when using the reconfigurable remote control transmitter according to the prior art, individual or separate actuations thereof are required for controlling operations of the television receiver and of the video tape recorder, respectively. In other words, operations of the television receiver and of the video tape recorder cannot be simultaneously controlled through a single actuation of the reconfigurable remote control transmitter.

OBJECTS AND SUMMARY OF THE INVENTION

Accordingly, it is an object of the present invention to provide an electronic apparatus which may have its operations remotely controlled by means of a remote control transmitter or commander other than that intended for use therewith, and which avoids the above mentioned disadvantages of the prior art.

More particularly, it is an object of the present invention to provide an audio and/or video electronic apparatus, such as, a television receiver or a video tape recorder, which, in a remote control mode, is capable of having operations thereof controllable by respective remote control codes in response to the reception of corresponding signals from a remote control transmitter intended for use with such apparatus, but which may be alternatively remotely controlled in response to the reception of control signals from another remote control transmitter intended for use with a different electronic apparatus.

In accordance with an aspect of this invention, in an electronic apparatus capable, in a remote control mode, of having operations thereof controllable by respective first remote control codes in response to the reception of corresponding signals from a first remote control transmitter intended for use with such apparatus; there are provided, as integral parts of the apparatus, nonvolatile memory means, means operative in a programming or learning mode of the apparatus for writing the first remote control codes in the nonvolatile memory means in association with respective second remote control codes for controlling the same operations as the associated first remote control codes and which are generated in response to the reception of corresponding control signals from a second remote control transmitter intended for use with a different electronic apparatus, and means operative in the remote control mode after the second remote control codes have been written in the nonvolatile memory means to respond to the reception of one of the control signals from the second remote control transmitter by reading out from the nonvolatile memory means the first remote control code which is associated in the nonvolatile memory means with the second remote control code corresponding to the received control signal for controlling the respective operation of the electronic apparatus in accordance with the read-out first remote code.

In accordance with another aspect of this invention, in the remote control mode after the second remote control codes have been written in the nonvolatile memory means in association with the respective first remote control codes, the operations of the electronic apparatus continue to be controllable by the respective first remote control codes in response to the reception of the corresponding control signals from the first remote control transmitter. For achieving the foregoing mode of operation, read only memory means desirably have the first remote control codes stored therein and, in the remote control mode after the second remote control codes have been written in the nonvolatile memory means in association with the first remote control codes, said first remote control codes are selectively read out of the read only memory means for contolling the operations of the electronic apparatus in response to the reception of the corresponding control signals from the first remote control transmitter.

The above, and other objects, features and advantages of the invention, will be apparent in the following detailed description of illustrative embodiments of the invention when read in connection with the accompanying drawings.

BRIEF DESCRIPTION OF THE DRAWINGS

FIG. 3 is a diagrammatic view illustrating the manner in which associated first and second remote control codes are stored in a nonvolatile memory included in the apparatus of FIG. 1.

DETAILED DESCRIPTION OF PREFERRED EMBODIMENTS

Figure 1:
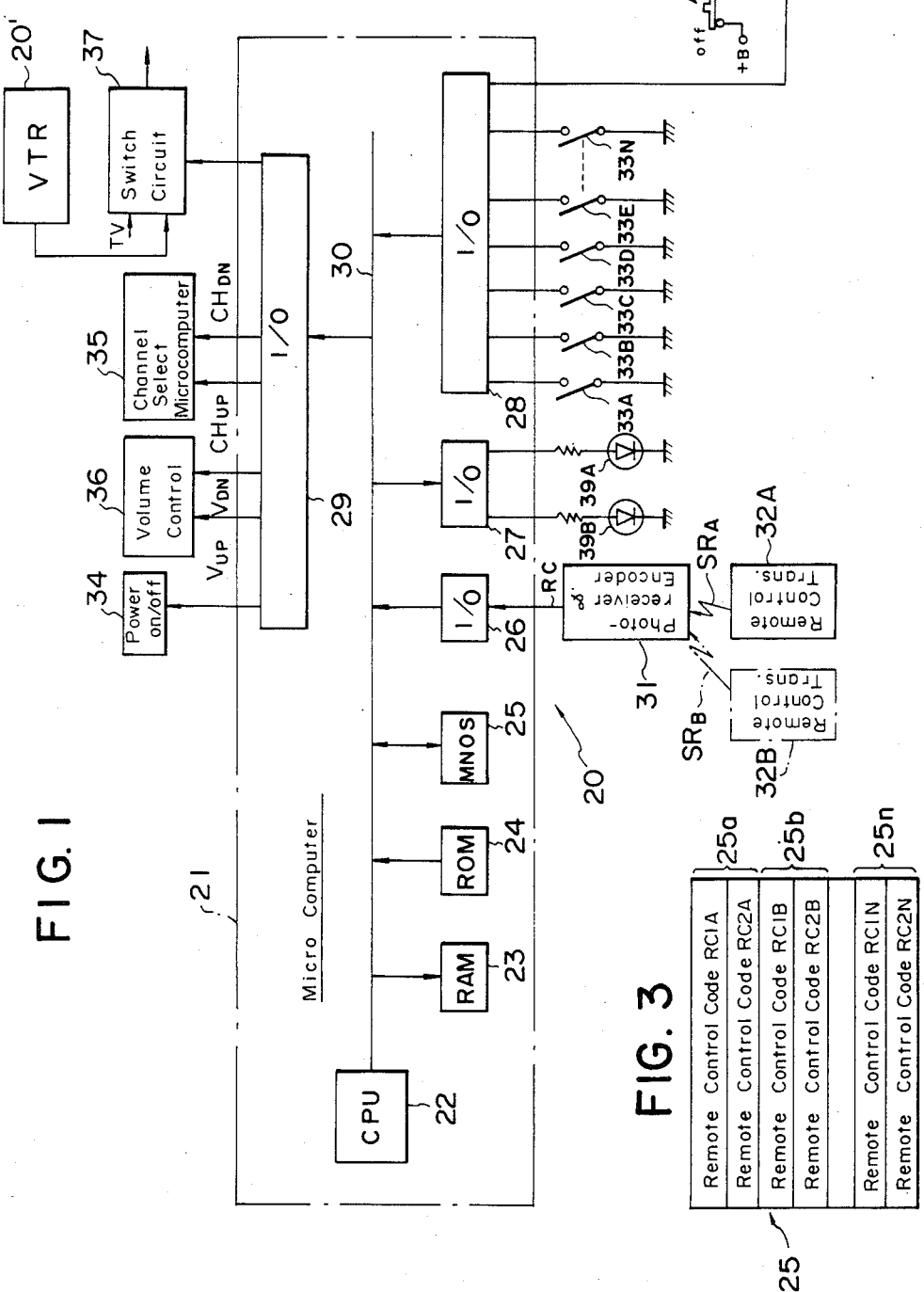
FIG. 1 is a schematic block diagram illustrating the essential components of an electronic apparatus according to an embodiment of the present invention.

Referring to the drawings in detail, and initially to FIG. 1 thereof, it will be seen that the present invention is there illustrated applied to a television receiver 20 capable of remote control operation, with only those elements or components of such receiver which are necessary for understanding of the present invention being shown schematically. More particularly, the television receiver 20 is shown to comprise, as an integral component thereof, a microcomputer 21 for controlling the operations of the television receiver and which includes a central processing unit (CPU) 22, a random access memory (RAM) 23 used, for example, by the CPU 22 during its data processing operations, a read only memory (ROM) 24 for storing predetermined remote control codes for controlling respective operations of the television receiver, a nonvolatile memory 25 which, for example, includes a metal-nitride-oxide semiconductor (MNOS), and is hereinafter further described in detail, input/output ports 26, 27, 28 and 29, and a connecting bus 30. The television receiver 20 is further shown to include a photo electric or light receiver and encoder 31 which is adapted to receive an infrared or other control signal SR from a remote control transmitter or commander 32A or 32B, and which generates a respective remote control code RC to be supplied through the input/output port 26 to the bus 30 and therethrough to the CPU 22. The remote control transmitter 32A, which may be intended for use with the television receiver 20 embodying this invention, and the remote control transmitter 32B which may be intended for use with another electronic apparatus, for example, a video tape recorder indicated schematically at 20', are apart or separate from the television receiver 20 embodying the invention, and may employ different sets of remote control codes for controlling corresponding operations.

Key-operated switches 33A, 33B,–33N are provided on the television receiver 20 and are selectively manually actuable by a user at the television receiver for controlling respective functions of the latter. When any one of the switches 33A, 33B,–33N is closed or turned ON, corresponding key-in data is supplied through the input port 28 and bus 30 to the CPU 22 which responds thereto by providing a corresponding control signal for control of the respective function or operation. For example, the switch 33A may be used for controlling the power ON and power OFF state of the television receiver. More specifically, in response to closing of switch 33A, a control signal is supplied from CPU 22 through bus 30 and port 29 to a power ON/OFF switch circuit 34 which is operative to change-over the television receiver 20 between a power ON state and a power OFF state in response to each successive actuation of key-operated switch 33A. The key-operated switches 33B and 33C may be used for changing the channel to which the television receiver is tuned in the upward and downward directions, respectively. More specifically, each time switch 33B is closed, the CPU 22 supplies an up signal $CH_{UP}$ through bus 30 and port 29 to a channel selection microcomputer 35 so that the channel to which the television receiver is tuned is incrementally changed to the next higher numbered channel. Similarly, each time the key-operated switch 33C is actuated or closed, the CPU 22 supplies a down signal $CH_{DN}$ through bus 30 and port 29 to the microcomputer 35 for incrementally changing the channel to which the television receiver is tuned to the next lower numbered channel. The key-operated switches 33D and 33E may be used for controlling the volume of the sound or audio issuing from the television receiver. More specifically, when switch 33D is closed, the CPU 22 supplies an up signal $V_{up}$ through bus 30 and port 29 to a volume control circuit 36 for increasing the volume of the sound from the television receiver. On the other hand, closing of the key-operated switch 33E causes the CPU 22 to supply a down signal $V_{DN}$ through bus 30 and port 29 to volume control circuit 36 for decreasing the volume of the sound from the television receiver.

The key-operated switch 33N is actuable to determine the source of the video signal to be displayed by the cathode ray tube (CRT) of the television receiver. More particularly, when the switch 33N is closed, the CPU 22 supplies a corresponding control signal through bus 30 and port 29 to a video source switching circuit 37 which, in response thereto, selects either a broadcast video signal TV or a video signal being reproduced or played back by the video tape recorder 20' to be displayed by the cathode ray tube (not shown) of the television receiver 20.

The television receiver 20 embodying this invention is further shown to have a slide switch 38 connected with the input/output port 28 for selectively establishing a learning or programming mode of the microcomputer 21. More specifically, when the switch 38 is in its illustrated OFF position for connection with a power source +B, the microcomputer 21 is in its normal or remote controllable mode for controlling the operations of the television receiver 20 either in response to actuation of the key-operated switches 33A, 33B,-33N, or in accordance with stored remote control codes in response to infrared control signals from the remote transmitter 32A ore 32B, as hereinafter described in detail. On the other hand, when switch 38 is moved to its ON position so that the connection to the port 28 is grounded, there is established a learning or programming mode of the microcomputer 21. In such learning mode, as hereinafter described in detail, first remote control codes for controlling respective operations of the television receiver 20 in response to the reception by the receiver and encoder 31 of corresponding control signals from the remote control transmitter 32A intended for use with the television receiver 20 are stored or written in nonvolatile memory 25 in association with respective second remote control codes for controlling the same operations and which are generated in response to the reception by the receiver and encoder 31 of corresponding control signals from the remote control transmitter 32B which is intended for use with a different electronic apparatus, for example, with the video tape recorder 20'.

The television receiver 20 according to the illustrated embodiment of the invention is further shown to include light-emitting diodes 39A and 39B connected through the input/output port 27 and bus 30 with the CPU 22 and being selectively supplied with energizing current from the CPU 22 for indicating when a learning or programming operation is started, and when such learning or programming operation is terminated.

It will be appreciated that the remote control transmitters 32A and 32B may be of conventional construction and thus are not shown or described in detail. For the purposes of this invention, it is sufficient that each of the transmitters 32A and 32B comprises user-actuated keys for remotely controlling at least the operations of a television receiver that are controllable at the receiver 20 by the key-operated switches 33A, 33B,-33N, respectively. Of course, if the transmitter 32B is intended for use with a video tape recorder, as in the illustrated embodiment, it will also have user-actuated keys for remotely controlling operations of such video tape recorder, such as, a record or playback key, a fast-forward key, a rewind key, a stop key and a pause or stop motion key. In any event, if the transmitters 32A and 32B are intended for use with electronic apparatus from different manufacturers, they are likely to employ different sets of remote control codes. For example, when remote control transmitter 32A has its keys actuated for remotely controlling those operations directly controlled by actuation of switches 33A, 33B,-33N, the infrared control signals $SR_A$ received by the receiver and encoder 31 cause the latter to provide respective first remote control codes RC1A, RC1B,-RC1N. It is to be noted that such first remote control codes RC1A, RC1B,-RC1N are also stored at corresponding addresses in the ROM 24. On the other hand, when remote control transmitter 32B has its keys actuated for remotely controlling the respective operations, the infrared control signals $SR_B$ then received by the receiver and encoder 31 cause the latter to provide respective second remote control codes RC2A, RC2B,-RC2N.

Figure 2:
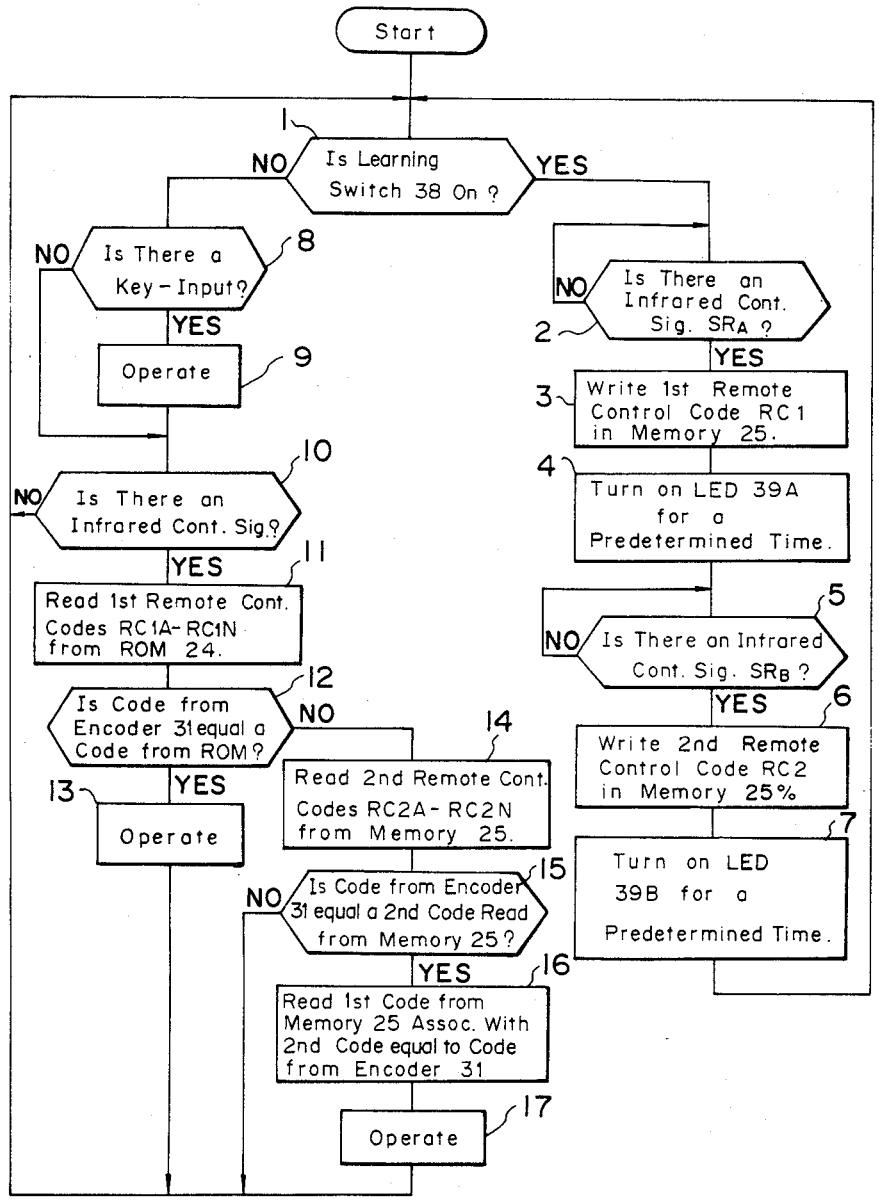
FIG. 2 is a flow chart to which reference will be made in explaining the operation of the apparatus according to the embodiment of the invention illustrated by FIG. 1.

The operation of the CPU 22 in the above described television receiver 20 according to this invention will now be described with reference to the flow chart of FIG. 2:

At the start of the control program of the CPU 22, in step 1, it is determined, on the basis of the signal supplied from switch 38 through the input/output port 28, whether such switch 38 is in its ON or OFF position, that is, whether or not the learning mode has been selected for performing a learning operation. If the learning mode has been established, that is, if the switch 38 is determined to be ON in step 1, the program preçeeds to step 2 in which it is determined whether or not an infrared control signal is being received by receiver and encoder 31 from a first remote control transmitter, for example, from the transmitter 32A intended for use with the television receiver 20 and which has one of its operation-controlling keys actuated. Such determination is made on the basis of whether or not a corresponding remote control code, for example, the code RC1A, is being delivered from the photo electric receiver and encoder 31. If it is determined, in step 2, that an infrared control signal $SR_A$ is being received from the transmitter 32A, the program proceeds to step 3 in which the corresponding remote control code RC1A supplied from the photo electric receiver and encoder 31 through the input/output port 26 is written as a first remote control code at a predetermined address in the nonvolatile or MNOS memory 25, as shown in FIG. 3. Thereafter, in step 4, an electric current is supplied for a predetermined period of time through the port 27 to the light-emitting diode (LED) 39A which is thereby illuminated as an indication of the start of a learning operation. In other words, the illumination of the LED 39A indicates that a first remote control code, that is, a remote control code corresponding to the reception of a respective control signal from the transmitter 32A has been written at a predetermined address in the nonvolatile memory 25.

Next, in the learning operation, the remote control transmitter 32A is replaced by the remote control transmitter 32B and the key of the latter for controlling the same operation of the television receiver as is controllable by the remote control code RC1A is actuated. In step 5; it is determined whether or not an infrared control signal $SR_B$ is being received by the receiver and encoder 31. If the reception of a control signal $SR_B$ is detected on the basis of the production of the corresponding remote control code RC2A by receiver and encoder 31, the program proceeds to step 6 in which such second remote control code RC2A is written in association with the corresponding first remote control code RC1A at a respective predetermined address 25a in the nonvolatile memory 25, as shown in FIG. 3. It will be appreciated that the first and second remote control codes RC1A and RC2A associated at the address 25a in memory 25 result from the actuations of keys of the remote control transmitters 32A and 32B, respectively, for achieving control of the same operation, for example, for turning the power ON and OFF, in a television receiver. After the writing of the second remote control code RC2A in memory 25, the program proceeds to step 7 in which an electric current is supplied through the port 27 to the light-emitting diode (LED) 39B for a predetermined period for indicating the completion of a phase of the learning operation, that is, the writing in the memory 25 of an associated pair of first and second remote control codes, for example, the codes RC1A and RC2A. Upon the extinguishing of the illumination of LED 39B, the control program returns to step 1 for determining if the learning operation is to be continued, that is, whether or not the switch 38 remains in its ON position.

With switch 38 remaining in its ON position, the remote control transmitter 32A is returned to a position in operative relationship to the receiver and encoder 31 and a second user-actuated key of transmitter 32A is operated to provide another infrared control signal $SR_A$ to the by receiver and encoder 31 for the repetition of the steps 2, 3 and 4, whereby, the respective first remote control code RC1B is written at the predetermined address 25b in memory 25. Then, transmitter 32A is replaced by transmitter 32B in operative relationship to the receiver and encoder 31, and a user-actuated key of transmitter 32B is operated to provide an infrared control signal $SR_B$ from transmitter 32B for the repetition of the previously described steps 5, 6 and 7, as a result of which the respective second remote control code RC2B is written in association with the first remote control code RC1B at the address 25b in the nonvolatile memory 25.

It will be appreciated that, in the learning mode, steps 2, 3 and 4 and steps 5, 6 and 7 are repeated with reference to infrared control signals $SR_A$ and $SR_B$ from transmitters 32A and 32B, respectively, until paired or associated first and second remote control codes have been written in memory 25 for the various operations of the television receiver to be controlled.

Although the paired or associated first and second remote control codes written in the memory 25 are generally for controlling the same operations of a television receiver, in the illustrated preferred embodiment of the invention the associated first and second remote control codes RC1N and RC2N preferably constitute an exception to this general rule. More specifically, in the case where the television receiver 20 embodying this invention is connected with the video tape recorder 20', the first remote control code RC1N resulting from operation of a user-actuated key of the transmitter 32A is adapted to control the video source switching circuit 37 of the television receiver 20, that is, to select either the broadcast video signal TV or the video signal being reproduced or played back by the video tape recorder 20' for display by the cathode ray tube of the television receiver. On the other hand, the second remote control code RC2N associated with the first remote control code RC1N results from the operation of the user-actuated key of the transmitter 32B which controls the record and playback operations of the video tape recorder 20'.

At the completion of the learning or programming operation, the user returns switch 38 to its OFF position so that, upon the return to the step 1, the OFF condition of the switch 38 is sensed and the control program proceeds to the step 8 in which it is determined whether a key-input is then being obtained from any of the switches 33A–33N. If any such key input is present, the control program proceeds to step 9 in which a suitable control signal is supplied from the CPU 22 through port 29 to the respective one of the circuits 34–37 for controlling the respective operation of the television receiver. If no key input is detected in step 8 or upon the completion of a television receiver control operation in step 9, the control program proceeds to step 10 in which it is determined whether or not an infrared control signal is being received by receiver and encoder 31 on the basis of whether or not a remote control code RC is being provided from the receiver and encoder 31. If it is determined, in step 10, that no infrared control signal is being obtained by receiver and encoder 31 from the transmitter 32A or 32B the control program returns to step 1.

However, if it is determined, in step 10, that an infrared control signal is being received by the receiver and encoder 31, the program moves to step 11, in which the first remote control codes RC1A, RC1B,-RC1N are read from the ROM 24 and then compared, in the next step 12, with the remote control code provided by the receiver and encoder 31 in response to the infrared control signal received by the latter. If it is determined, in step 12, that the remote control code provided from the encoder 31 is one of the first remote control codes read out of the ROM 24, as is the case when the infrared control signal is from the transmitter 32A intended for use with the television receiver 20 so that the respective remote control code is one of the first remote control codes RC1A-RC1N, the CPU 22 is effective, in the step 13, to provide a suitable control signal through the port 29 for controlling the operation of the television receiver in accordance with the first remote control code produced by the receiver and encoder 31 and, thereafter, the control program returns to step 1.

On the other hand, if it is determined, in step 12, that the remote control code obtained from the receiver and encoder 31 is not the same as one of the first remote control codes RC1A-RC1N in the ROM 24, the control program proceeds to the step 14 in which the second remote control codes RC2A-RC2N are read from the nonvolatile memory or MNOS 25 and then compared, in the following step 15, with the remote control code from the receiver and encoder 31. In other words, in step 15, it is determined whether or not the remote control code from the receiver and encoder 31 is equal to any of the second remote control codes RC2A-RC2N read from the nonvolatile memory 25.

If it is determined, in step 15, that the remote control code being provided by the receiver and encoder 31 is not one of the second remote control codes RC2A-RC2N read from the nonvolatile memory 25, then it follows that the remote control code being provided from the receiver and encoder 31 results from an infrared control signal from a remote control transmitter other than the transmitter 32A intended for use with the television receiver 20 or the transmitter 32B for providing the second remote control codes that were written in the nonvolatile memory 25 during the learning operation. In that case, the control program is returned from step 15 to step 1. However, if it is determined, in step 15, that the remote control code provided by the receiver and encoder 31 is equal to one of the second remote control codes RC2A-RC2N read from the nonvolatile memory 25, the control program proceeds to the step 16 in which there is read from the memory 25 the one of the first remote control codes RC1A–RC1N which is associated with the one of the second remote control codes RC2A–RC2N equal to the remote control code from encoder 31. Thereafter, in the following step 17, the one of the first remote control codes RC1A–RC1N read from the nonvolatile memory 25 causes the CPU 22 to supply a corresponding control signal through the port 29 for controlling the respective operation of the television receiver 20, and then the control program returns to step 1.

So long as the switch 38 remains in its OFF position for selecting the normal or remote control mode of the television receiver 20, the above described steps 8–17 are repeatedly performed.

It will be appreciated that, in the television receiver 20 in accordance with the described embodiment of the invention, after a learning operation for writing in memory 25 the second remote control codes RC2A–RC2N resulting from the use of the transmitter 32B in association with the first remote control codes RC1A–RC1N resulting from the use of the transmitter 32A, the operations of the television receiver can be remotely controlled either by the remote control transmitter or commander 32A intended for use with that television receiver 20, or by the remote control transmitter or commander 32B, for example, intended for use with the video tape recorder 20' or other electronic apparatus from another manufacturer and employing a different set of remote control codes. In other words, when switch 38 is in its OFF position following the described learning operation for recording the second remote control codes RC2A–RC2N in the nonvolatile memory 25 in association with the first remote control codes RC1A–RC1N, the use of the remote control transmitter 32A for the television receiver 20 in directing an infrared control signal to receiver and encoder 31 causes the latter to provide a corresponding one of the first remote control codes RC1A–RC1N and the CPU 22 responds thereto for providing the respective control signal through the port 29 for effecting the corresponding controlling operation of the television receiver. On the other hand, when the remote control transmitter 32B of a manufacturer different from that which produced the television receiver is used for the remote control of the latter, the resulting one of the second remote control codes RC2A–RC2N provided by the receiver and encoder 31 is located among the second remote control codes written in the nonvolatile memory 25 and the associated one of the first remote control codes RC1A–RC1N is read out from such memory 25 so that the CPU 22 may similarly respond to such read out first remote control code for providing the control signal through port 29 for controlling the respective operation of the television receiver. As a consequence of the foregoing, it is apparent that, in the television receiver 20 according to the described embodiment of the invention, after the learning operation, the remote control opertion of the television receiver 20 can be effected either by the remote control transmitter 32A intended for use with such television receiver or by the remote control transmitter 32B provided for the video tape recorder 20' or other electronic apparatus from a different manufacturer employing other remote control codes.

Alternatively, if desired, after the learning operation, that is, after the second remote control codes RC2A ∝ RC2N have been written in the nonvolatile memory 25 in association with the first remote control codes RC1A–RC1N, respectively, the system may be configured so that the remote control operation is thereafter attainable only be means of the remote control transmitter 32B to which the second remote control codes correspond. In such case, of course, the step 13 appearing on the flow chart of FIG. 2 would be omitted and the control program of the CPU 22 could be otherwise similar to that previously described.

As earlier noted, in the learning operation, it is desirable that the second remote control code RC2N be made to correspond to the change-over of the video tape recorder 20' from its recording mode to its playback mode under the remote control of the transmitter 32B, and that such second remote control code RC2N be written in the nonvolatile memory 25 in association with the first remote control code RC1N which is made to correspond to the change-over of the video source switching circuit 37 to select the video signal output from the video tape recorder 20' for display by the cathode ray tube of the television receiver 20. In such case, only a single key of the remote control transmitter 32B has to be actuated by the user for simultaneously controlling the television receiver and the video tape recorder when it is desired to change from a condition in which the television receiver 20 is diplaying a broadcast TV picture which is being simultaneously recorded by the associated video tape recorder 20', to the condition in which the television receiver 20 displays the video or TV picture being played back or reproduced by the associated video tape recorder 20'. In other words, when the single key of the transmitter 32B is actuated to provide the second remote control code RC2N, such second remote control code is effective, in the video tape recorder, for changing over the latter to its playback mode, while that second remote control code RC2N is located in the nonvolatile memory 25 of the television receiver to cause read out of the associated first remote control code RC1N by which the input of the television receiver is changed from the broadcast TV signal to the reproduced video signal from the VTR.

Although the illustrated embodiment of the invention is described as being applied to a television receiver, it will be apparent that the invention may be similarly applied to any other electronic apparatus capable of being remotely controlled.

As distinguished from the reconfigurable remote control transmitters referred to above as being disclosed in U.S. Pat. No. 4,623,887, and in U.S. Pat. No. 4,626,848, the learning operation in accordance with the present invention is effected by components that are integral parts of the remotely controlled apparatus itself, for example, integral parts of the television receiver, rather than of a remote control transmitter or commander. By reason of the foregoing, existing remote control transmitters can be used without modifications thereof, and the size and power consumption of the remote control transmitters used with an electronic apparatus embodying this invention need not be increased. Furthermore, the reconfigurable remote control transmitters disclosed in the identified patents cannot be used to effect the previously described simultaneous control of the operations of a television receiver and a video tape recorder by the operation of a television receiver and a video tape recorder by the operation of a single user-actuated key on a remote control transmitter.

Although a preferred embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In an electronic apparatus having means for establishing a remote control mode, means operable in said remote control mode for providing first remote control codes in response to corresponding control signals from a first remote control transmitter intended for use with said apparatus, and means receiving said first remote control codes for controlling respective operations of the apparatus; a combination, as an integral component of said apparatus, comprising non-volatile memory means, means for establishing a learning mode of said apparatus, means operative in said learning mode for writing said first remote control codes at respective addresses in said nonvolatile memory means, means operative in said learning mode for providing second remote control codes which correspond to respective ones of said first remote control codes for controlling the same operations as said respective first remote control codes and which are generated in response to corresponding control signals from a second remote control transmitter intended for use with a different electronic apparatus, means operative in said learning mode for writing said second remote control codes in said nonvolatile memory means at addresses of the latter which correspond to said address at which said respective first remote control codes have been written, and means operative in said remote control mode after said second remote control codes have been written in said nonvolatile memory means and responding to one of said control signals from said second remote control transmitter for reading out from said nonvolatile memory means one of said first remote control codes from an address in said memory means corresponding to the address of the second remote control code which corresponds to said one control signal from said second remote control transmitter for controlling the operation of the electronic apparatus in accordance with the read-out first remote control code.

2. An electronic apparatus according to claim 1; wherein said nonvolatile memory means includes an MNOS.

3. An electronic apparatus according to claim 1; wherein said means operative in said remote control mode after said second remote control codes have been written in said nonvolatile memory means continues to control said operations of the apparatus by said respective first remote control codes in response to said corresponding control signals from said first remote control transmitter.

4. An electronic apparatus according to claim 3; further comprising read only memory means in which said first remote control codes are stored; and in which said means operative in said remote control mode after said second remote control codes have been written in said nonvolatile memory means selectively reads out said first remote control codes from said read only memory means for controlling said operations of the apparatus in response to said corresponding signals from said first remote control transmitter.

5. An electronic apparatus according to claim 1; wherein said means operative in said remote control mode after said second remote control codes have been written in said nonvolatile memory means can read out any one of said first remote control codes for controlling the respective operation of the electronic apparatus only in response to the control signal from said second remote control transmitter which corresponds to the one of said second remote control codes corresponding to said one of the first remote control codes.

6. A combination of an electronic apparatus capable, in a remote control mode, of having operations thereof controlled by respective first remote control codes; a first remote control transmitter intended for use with the first mentioned electronic apparatus and being operable to transmit first control signals corresponding to said first remote control codes; and a second remote control transmitter intended for use with a different electronic apparatus and being operable to transmit second control signals corresponding to second remote control codes for controlling the same operations as at least some of said first remote control codes; said first mentioned electronic apparatus including, as integral parts thereof, nonvolatile memory means, means operative in a learning mode of said first electronic apparatus for writing said second remote control codes in said nonvolatile memory means in association with said first remote control codes which control the same operations, and means operative in said remote control mode after said second remote control codes have been written in said nonvolatile memory means in response to one of said second control signals by reading out from said nonvolatile memory means a respective one of said first remote control codes associated a respective one of the second remote control code which corresponds to said one second control signal for controlling the operation of said first mentioned electronic apparatus in accordance with the read-out first remote control code.

7. A video system comprising: a first television receiver capable, in a remote control mode, of having operations thereof controlled by respective first remote control codes; a first remote control transmitter intended for use with said television receiver and being operable to transmit first control signals corresponding to said first remote control codes for selectively controlling the respective operations of said first television receiver; a video tape recorder adapted for recording video signals received by said first television receiver and being capable, in a remote control mode, of having operations thereof controlled by respective second remote control codes; and a second remote control transmitter intended for use with said video tape recorder and being operable to transmit second control signals corresponding to the first mentioned second remote control codes for controlling said operations of the video tape recorder and also corresponding to a second group of second remote control codes adapted for controlling operations of a second television receiver controllable by said second remote control codes; said first television receiver including, as integral parts thereof, nonvolatile memory means, means opertive in a learning mode of said first television receiver for writing said second group of said second remote control codes for controlling respective operations of the second television receiver in association with at least some of said first remote control codes which control the same operations of said first television receiver, and means opertive in said remote control mode after said second group of second remote control codes have been written in said nonvolatile memory means for responding to a received one of said second control signal from said second remote control transmitter by reading out from said nonvolatile memory means a respective one of said first remote control codes associated with a respective one of the second remote control codes which corresponds to said one received second control signal for controlling the operation of said first television receiver in accordance with the read-out first remote control code.

8. A video system according to claim 7; wherein said first television receiver includes input selection means for selectively connecting an input of said first television receiver to a source of a broadcast TV signal and to an output of said video tape recorder, and said video tape recorder is selectively operable in a recording mode and in a playback mode; and further comprising means responsive to one of said first mentioned second remote control codes for causing change-over of said video tape recorder from said recording mode to said playback mode simultaneously with the read out from said nonvolatile memory means of a respective one of said first remote control codes for causing said input selection means to connect said input of said first television receiver with said output of the video tape recorder.

9. A video system according to claim 8; wherein said nonvolatile memory means includes an MNOS.

10. A video system according to claim 8; wherein, in said remote control mode after said second group of second remote control codes have been written in said nonvolatile memory means in association with said first remote control codes, said operation of said first television receiver continue to be controllable by said respective first remote control codes in response to said corresponding first control signals from said first remote control transmitter.

11. A video system according to claim 10; further comprising read only memory means having said first remote control codes stored therein; and means operative in said remote control mode, after said second group of second remote control codes have been written in said nonvolatile memory means in association with said first remote control codes, for selectively reading out said first remote control codes from said read only memory means for controlling said operations of the first television receiver in response to the reception of said corresponding first control signals from said first remote control transmitter.

12. A video system according to claim 8; wherein, after said second group of second remote control codes have been written in said nonvolatile memory means, each of said first remote control codes can be read-out for controlling the respective operation of said first television receiver only in response to the reception from said second remote control transmitter on one of the second control signals corresponding to the respective one of the second remote control codes associated with said each first remote control code.

* * * * *